(No Model.)
N. SHAW.
PULLEY OR WHEEL.
No. 418,076. Patented Dec. 24, 1889.
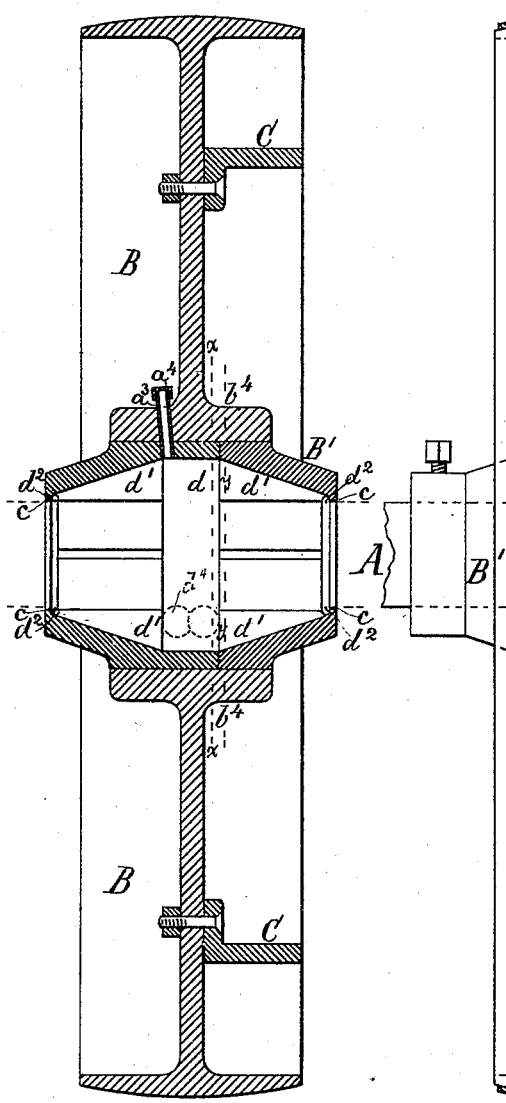
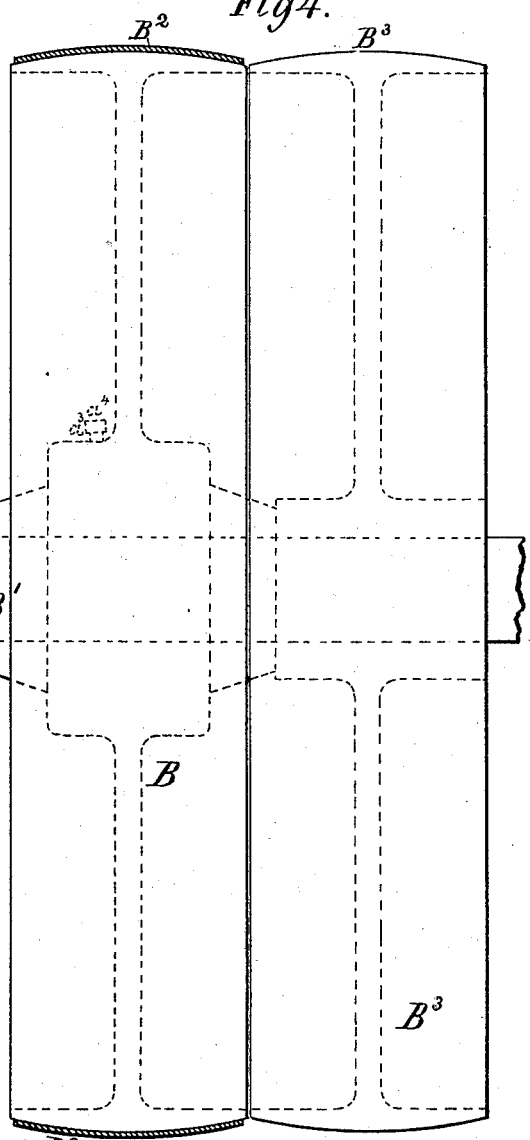
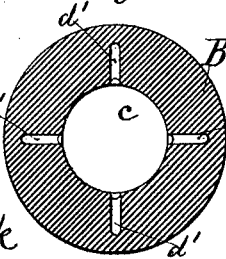
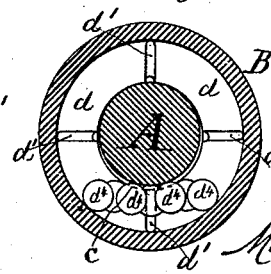
Witnesses:
Inventor:
Noah Shaw
by his Atty
Mason, Fenwick & Lawrence

UNITED STATES PATENT OFFICE.

NOAH SHAW, OF EAU CLAIRE, WISCONSIN.

PULLEY OR WHEEL.

SPECIFICATION forming part of Letters Patent No. 418,076, dated December 24, 1889.

Application filed November 28, 1888. Serial No. 292,105. (No model.)

*To all whom it may concern:*

Be it known that I, NOAH SHAW, a citizen of the United States, residing at Eau Claire, in the county of Eau Claire and State of Wisconsin, have invented certain new and useful Improvements in Pulleys and Wheels; and I do hereby declare the following to be a full, clear, and exact description of the invention, such as will enable others skilled in the art to which it appertains to make and use the same.

My invention relates especially to that class of pulleys and wheels which are used either in connection with clutch mechanisms or shifting-belts, which pulleys or wheels are at times caused to revolve with their shafts and at other times are allowed to remain idle.

My invention consists in a novel construction, as will be hereinafter described and pointed out in the claims, of the eyes, bores, or interior chambers of the hubs of such pulleys or wheels, whereby the pulleys or wheels are enabled to carry a large amount of fluid lubricant, and they and their shafts can be automatically lubricated, and waste of the lubricant carried in the hubs is avoided both when the pulleys are at rest and during the revolutions of the pulleys with their shafts, at which latter time lubrication is not necessary between the pulleys and their shafts.

It also consists in combining buoyant oil-conductors with such pulleys or wheels and their shafts.

In the accompanying drawings, Figure 1 is a vertical central section of my improved pulley or wheel provided, in this instance, with an ordinary clutching-flange, whereby it is adapted for use in connection with any suitable clutch mechanism. Fig. 2 is a cross-section of the hub in the line $x\ x$ of Fig. 1, removed from its shaft. Fig. 3 is a similar section of the hub in the line $y\ y$ of Fig. 1, it being on its shaft; and Fig. 4 is an illustration of my invention as used in connection with a shifting-belt and a fast and loose pulley or wheel.

The letter A in the drawings is intended to represent either a driving-shaft, which is adapted to be stopped and started by means of a clutch mechanism such as is shown in either of my applications for patents filed June 4, 1888, Serial No. 275,996, and June 6, 1888, Serial No. 276,243, or by any other suitable or well-known clutch mechanism fast on and revolving with the shaft, or by a shifting-belt mechanism combining a fast and loose pulley, as B and $B^3$.

B, Fig. 1, represents a clutch-pulley having a friction-rim C, whereby it is adapted for use with my aforesaid and other appropriate clutch mechanisms.

In Fig. 4 the rim C is dispensed with, as the pulley B therein shown is placed as usual alongside of a fast pulley $B^3$, and said pulley $B^3$ is set in motion by shifting upon it the driving-belt $B^2$ from the pulley B.

Referring to the drawings, Figs. 1, 2 and 3, it will be seen that the hub B′ of the pulley B is shown formed of two parts united on the line $y\ y$; but if desirable it may be constructed in one piece. The intermediate portion of the eye, bore, or chamber of this hub is cylindrical, as at $d$, and of greatly-increased diameter over that of the bore proper $c\ c$, and the extension on each side of this intermediate portion $d$, while also cylindrical, as shown, is provided with a plurality—say four—of oppositely placed and spaced inclined longitudinal grooves $d'$, and with annular end grooves $d^2$, the inclined grooves being all of the same depth below the bearing-surface of the hub with a radial depth where they connect with the chamber $d$ equal with that from the bore of the hub to the surface of the inner wall of the chamber $d$, and the annular grooves $d^2$, which are also below said surface, being of a depth about equal to the outer termini of the inclined grooves, as shown, and the reservoir $d$, the inclined grooves $d'$, and the annular grooves $d^2$ being all in communication with one another the fluid lubricant contained in the reservoir $d$ can pass from the reservoir $d$ along the inclined grooves into the annular grooves and back into the reservoir. The bore proper $c\ c$ of the hub in which the shaft A is fitted is of a diameter between the annular grooves, as well as laterally beyond said grooves to the termini of the bore, say, for instance, about one sixty-fourth of an inch larger than the diameter of the shaft, while the diameter of the annular grooves themselves is, say, for instance, about three sixty-fourths of an inch greater than the diameter of the said bore. These proportions, however, may be varied as found most desirable. For the introduction of lubricant into the reservoir a tube $a^3$, having a removable cap $a^4$, may be inserted into the hub and made to communicate with the reservoir $d$, as shown.

In the drawings the hub B' is shown with the enlarged or box part $b^4$ of the pulley fitted upon it; but any other suitable way of having the hub and pulley united may be adopted without departing from my invention. For instance, the hub B' and pulley B might be cast in one piece.

From the foregoing description it will be apparent that if the reservoir is supplied with lubricant up to the bearing-surface proper of the eye or bore of the hub such lubricant will run along the bottom series of inclined grooves on each side of the reservoir, and thus lubricate the shaft along the whole length of the hub while the pulley is at rest, and that when the pulley and shaft are revolved together the lubricant, which is in said grooves as well as in said chamber, will by centrifugal force be set in rapid motion and all kept near the periphery of the cylindrical portion of the reservoir $d$, and thus saved from being wasted out at the ends of the hub; but upon the release of the pulley from the clutch mechanism of the shaft all of the lubricant will gradually settle down in the lower part of the reservoir and the lower series of inclined grooves, and whatever portion of the lubricant may be carried around by the momentum of the pulley, so as to stand in an upper series of inclined grooves, will flow in such grooves into the annular grooves $d^2$, and from thence along the series of lower inclined grooves back into the reservoir, and upon the pulley becoming perfectly at rest the lubricant will lie in the lower portion of the reservoir, the lower series of inclined grooves, and the annular grooves, and thus directly, or by means of buoyant conductors $d^4$, lubricate the shaft; and if an additional quantity is required, to have it extend up or be conducted to the shaft, the same is supplied through the tube $a^3$, as before described, and by this means the shaft can be constantly and perfectly lubricated.

It will be understood from the foregoing that the lubricant, by reason of its fluidity and the radial or centrifugal force exerted upon it, becomes equally diffused around the inner periphery of the reservoir $d$, and is thus kept away from the shaft, which does not, when the pulley and shaft are revolving together, require the lubricant to be supplied to it. It will also be understood that as soon as the pulley is unclutched and allowed to become loose on the shaft and its motion begins to slacken or ceases entirely the said centrifugal force no longer influences the lubricant, and it is free to flow through the upper inclined grooves toward the ends of the hub, thence pass into the annular grooves, where it is arrested, collected, and, by its gravity, allowed to flow back through the lower inclined grooves into the reservoir. No waste at the ends of the hub can occur, as its passage outward is prevented by means of the annular grooves and capillary attraction. The same operation takes place with the pulley B, (as shown in Fig. 4,) for as soon as the belt $B^2$ is shipped from the fast pulley $B^3$ to the loose pulley B, as shown, the oil or lubricant in the reservoir or receptacle of the loose pulley is kept by centrifugal force radially exerted within the reservoir or receptacle and in close proximity to its periphery all around; but as soon as the belt is passed upon the fast pulley the oil settles in the reservoir of pulley B, flows along the upper series of inclined grooves into the annular grooves, and back through the lower series of the inclined grooves into the reservoir.

In the oil-chamber $d$ of the hub B cork or other suitable buoyant lubricant-conductors $d^4$ may be placed so as to float upon the oil and come in contact with the shaft A, and thus carry oil to it and insure lubrication of same when the height of the oil is below said shaft.

There is importance in providing more than one inclined groove at each end of the hub, because unless the pulley rests with the groove at the bottom of the hub the oil will not pass along said groove from the chamber $d$, and as the pulley does not always become at rest with the same portion of its periphery below the axle it is essential to provide a plurality of grooves—say four at least—so that in the pulley settling or coming to a rest there may be a certainty almost of one of the series of grooves lying at or near the bottom of the oil-chamber of the pulley. If three grooves only should be provided, one at the bottom and two on a horizontal plane with the center of the bore of the hub, there would be a good chance for the oil to circulate along the three grooves when the oil-chamber is a little more than half full of oil; but as there is less certainty of one of these three grooves resting at the bottom of the oil-chamber $d$ than there would be if four grooves were provided it is preferable to use at least four grooves, for when four are provided there will be an opportunity then of a groove resting at the bottom of the oil-chamber on every quarter-turn of the pulley. In a word, the greater the number of inclined grooves provided the greater will be the certainty of lubrication of the shaft or axle by circulation of the oil when the pulley is brought to a rest.

My invention of combining free or buoyant oil-conductors with the annular oil-chamber $d$, inclined longitudinal and radial grooves, and annular end grooves insures a more perfect distribution of the oil, as such conductors in rotating around in the annular chamber $d$ carry and conduct the oil in contact with the shaft. The buoyant floating conductors, in the relation in which they are placed, differ from buoyant conductors which are in a fixed body of oil and do not revolve in an annular chamber, and they also operate on a different principle from an annular porous collar or washer placed around the axle or shaft. It is important, also, to construct the bottom of the oil-chamber with a depth radially from the center of the bore of the hub just equal to the greatest radial depth of the inclined grooves, for by this construction the oil, when at a very shallow depth, will continue to fill the grooves and thereby lubricate the axle as they successively come around at the bottom of the hub, which would not be the case if the radial depth of the oil-chamber was considerably greater than that of the greatest radial depth of the inclined grooves. In this respect my improved pulley operates on a different principle from pulleys as heretofore constructed with a central oil-chamber, annular end grooves, and a radial inclined groove at each end of the hub between the oil-chamber and the annular grooves, the greatest radial depth of which end grooves is less than the oil-chamber, as with my construction of oil-chamber and an inclined groove having a radial depth at its inner end equal to the chamber, lubrication is insured by the groove alone conducting the fresh oil to the ends of the hub and returning the used oil to the chamber and thus rendering unnecessary the employment of an annular porous washer on the axle, as heretofore, such washer extending into a chamber of greater radial depth than the deepest portion of the inclined groove, and by capillary attraction conducting the oil from said chamber to the axle, while the grooves used with this washer are intended only for returning the used oil to the chamber; and this being the case, while I regard a plurality of grooves—say four—very important for more certainly and perfectly effecting the lubrication, whatever portion of the pulley stands below the axle, I also regard it an essential improvement in pulleys to employ only one inclined groove at each end hub and have the radial depth of the oil-chamber from the bore of the hub to the inner surface of the wall of the chamber correspond with the deepest radial depth of the said inclined grooves, and I include such construction under my patent.

This invention is very simple and effective and greatly economizes the use of lubricant, and it will be found useful in connection with any wheel which periodically is allowed to have freedom to become loose on its shaft.

I do not claim, notwithstanding I have shown and described the same, a fast and loose pulley which is not provided with a friction clutching-flange; neither do I claim cork floats applied in a hub or box wherein the oil does not flow longitudinally of the axle-box; but What I do claim is—

1. The pulley having a hub provided with a central oil-chamber, annular end grooves, and an inclined radial and longitudinal groove at each end between the chamber and annular grooves, the radial depth of the said chamber from the bore of the hub to the inner surface of the wall of the chamber being the same as the deepest radial depth of the inclined grooves, substantially as described.

2. A pulley having a clutching-flange and a hub provided with a central cylindrical chamber $d$ of greater diameter than its bore $c$, annular grooves $d^2$ at its ends, and a plurality of, say, four inclined radial and longitudinal oil-circulation grooves $d'$ at the respective ends of said hub between said chamber and annular grooves, said grooves having a radial depth where they connect with the chamber $d$ equal to that from the bore of the hub and the inner surface of the wall of the chamber, substantially as described.

3. A pulley having a hub provided with a cylindrical chamber $d$ of greater diameter than its bore, annular grooves $d^2$ at the ends of the hub, and a plurality of, say, four inclined radial and longitudinal oil-circulation grooves $d'$ at the respective ends of the hub between said chamber and annular grooves, said grooves having a radial depth where they connect with the chamber $d$ equal to that from the bore of the hub to the inner surface of the wall of the chamber, substantially as described.

4. The combination of free floating buoyant conductors $d^4$ with a pulley provided with a cylindrical chamber $d$ of greater diameter than its bore $c$, in which the conductors are placed, annular grooves $d^2$ at the ends of the hub, and a plurality of, say, four inclined radial and longitudinal grooves $d'$ at the respective ends of the hub between said chamber and annular grooves, said grooves having a radial depth where they connect with the chamber $d$ equal to that from the bore of the hub to the inner surface of the wall of the chamber, substantially as described.

In testimony whereof I hereunto affix my signature in presence of two witnesses.

NOAH SHAW.

Witnesses:
C. A. CHAMBERLIN,
C. H. INGRAM.